United States Patent
Tsuji et al.

(10) Patent No.: US 11,396,296 B2
(45) Date of Patent: Jul. 26, 2022

(54) CONTROL SYSTEM OF VEHICLE, CONTROL METHOD OF THE SAME, AND NON-TRANSITORY COMPUTER-READABLE STORAGE MEDIUM

(71) Applicant: HONDA MOTOR CO., LTD., Tokyo (JP)

(72) Inventors: Kanta Tsuji, Wako (JP); Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 16/733,693

(22) Filed: Jan. 3, 2020

(65) Prior Publication Data
US 2020/0231159 A1    Jul. 23, 2020

(30) Foreign Application Priority Data

Jan. 17, 2019 (JP) .............................. JP2019-006172

(51) Int. Cl.
*B60W 30/18* (2012.01)
*B60W 50/14* (2020.01)
(Continued)

(52) U.S. Cl.
CPC ...... *B60W 30/18163* (2013.01); *B60W 50/14* (2013.01); *B62D 15/0255* (2013.01); *G08G 1/167* (2013.01)

(58) Field of Classification Search
CPC .............. B62D 15/0255; B62D 15/025; B62D 15/0265; B60W 30/18163; B60W 50/14;
(Continued)

(56) References Cited

U.S. PATENT DOCUMENTS 9,809,164 B2    11/2017   Matsuno et al.
9,889,884 B2    2/2018    Matsuno et al.
(Continued)

FOREIGN PATENT DOCUMENTS

DE    102017213211 A1 *   2/2019   ............. G08G 1/167
JP    2009-18625 A        1/2009
(Continued)

OTHER PUBLICATIONS

Office Action dated Dec. 4, 2020, issued in counterpart JP Application No. 2019-006172, with partial English translation. (4 pages).

(Continued)

*Primary Examiner* — Abby Y Lin
*Assistant Examiner* — Hossam M Abd El Latif
(74) *Attorney, Agent, or Firm* — WHDA, LLP (57) ABSTRACT

A control system of a vehicle, comprises: a control unit that controls a lane change operation from a travel lane on which the vehicle is traveling to an adjacent lane; a detection unit that detects a driver's lane change intention; and a switching unit that switches between a first control state in which the lane change operation of the vehicle is restricted and a second control state in which the lane change operation of the vehicle is possible, wherein in a case in which the detection unit detects the driver's lane change intention when the state of the vehicle is in the first control state, the lane change operation by the control unit is performed after the switching unit has shifted the state of the vehicle from the first control state to the second control state.

16 Claims, 5 Drawing Sheets

(51) Int. Cl.
*B62D 15/02* (2006.01)
*G08G 1/16* (2006.01)

(58) Field of Classification Search
CPC ... B60W 2520/105; B60W 2554/4041; B60W 2554/4045; B60W 30/09; B60W 40/04; B60W 2520/10; B60W 2754/30; B60W 2756/10; B60W 30/0956; B60W 30/12; B60W 30/16; B60W 40/08; B60W 50/0097; B60W 60/0016; B60W 60/0027; B60W 2540/20; B60W 2540/225; G08G 1/1678; G08G 1/167; G08G 1/096708; G08G 1/096791; G08G 1/166
USPC .......................................................... 701/41
See application file for complete search history.

(56) References Cited

U.S. PATENT DOCUMENTS

| | | | | |
|---|---|---|---|---|
| 2014/0074356 A1* | 3/2014 | Bone | ................ | G08G 1/167 701/41 |
| 2016/0107687 A1* | 4/2016 | Yamaoka | ........... | B62D 15/0255 701/41 |
| 2016/0304097 A1* | 10/2016 | Taira | ..................... | B60W 10/20 |
| 2018/0067496 A1* | 3/2018 | Prasad | .................. | G01S 15/931 |
| 2018/0170384 A1* | 6/2018 | Masui | ..................... | G01S 13/86 |
| 2019/0092346 A1 | 3/2019 | Odate et al. | | |
| 2020/0240806 A1* | 7/2020 | Daikoku | ............... | G01S 19/426 |
| 2021/0146943 A1 | 5/2021 | Oniwa et al. | | |
| 2021/0269040 A1* | 9/2021 | Kurokawa | ...... | B60W 30/18163 |

FOREIGN PATENT DOCUMENTS

| | | | | | |
|---|---|---|---|---|---|
| JP | 2010-262665 | A | | 11/2010 | |
| JP | 4968369 | B2 | * | 7/2012 | |
| JP | 2012-252500 | A | | 12/2012 | |
| JP | 2014181020 | A | * | 9/2014 | ............ B60W 50/16 |
| JP | 2015-150979 | A | | 8/2015 | |
| JP | 2016-2892 | A | | 1/2016 | |
| JP | 2016-4443 | A | | 1/2016 | |
| WO | 2017/168541 | A1 | | 10/2017 | |
| WO | 2018/220827 | A1 | | 12/2018 | |

OTHER PUBLICATIONS

Office Action dated Jul. 26, 2021, issued in counterpart JP Application No. 2019-006172, with Partial English translation. (4 pages).

* cited by examiner

CONTROL SYSTEM OF VEHICLE, CONTROL METHOD OF THE SAME, AND NON-TRANSITORY COMPUTER-READABLE STORAGE MEDIUM

CROSS-REFERENCE TO RELATED APPLICATION

This application claims priority to and the benefit of Japanese Patent Application No. 2019-006172 filed on Jan. 17, 2019, the entire disclosure of which is incorporated herein by reference.

BACKGROUND OF THE INVENTION

Field of the Invention

The present invention relates to a control system of a vehicle, a control method of the same, and a non-transitory computer-readable storage medium.

Description of the Related Art

In vehicle driving support control, there is known control associated with lane changing. For example, Japanese Patent Laid-Open No. 2015-150979 discloses a method in which the line of sight of a driver is monitored to determine the contents of lane change control based on the changes in the line of sight of the driver.

In driving support control, a periphery monitoring duty and an operation duty requested of the driver will change depending on the control level. For example, in a case in which a traffic jam occurs while automatic preceding vehicle following control is being performed while the vehicle is traveling on a single lane, the vehicle will be controlled at a level in which the periphery monitoring duty and the steering wheel gripping duty will not be requested of the driver.

When such automatic preceding vehicle following control as described above is being performed, the driver may desire to change lanes. On the other hand, since there are a plurality of control levels of driving support control, it is important, in terms of safety, to perform lane change after the control level has shifted to an appropriate control level. Also, since the operations requested of the driver will change in the manner described above when the control level is to be shifted, it is necessary to confirm whether a user is appropriately performing the required operations.

SUMMARY OF THE INVENTION

Hence, the present invention has as its object to perform control so as to estimate a case in which a lane change will be performed when a driving support control level is at a predetermined level, and to shift the driving support control level to an appropriate control level to safely perform a lane change.

An embodiment according to the present invention, there is provided a control system of a vehicle, comprising: a control unit configured to control a lane change operation from a travel lane on which the vehicle is traveling to an adjacent lane; a detection unit configured to detect a driver's lane change intention; and a switching unit configured to switch between a first control state in which the lane change operation of the vehicle is restricted and a second control state in which the lane change operation of the vehicle is possible, wherein in a case in which the detection unit detects the driver's lane change intention when the state of the vehicle is in the first control state, the lane change operation by the control unit is performed after the switching unit has shifted the state of the vehicle from the first control state to the second control state.

Another embodiment according to the present invention, there is provided a control method of a vehicle, the method comprising: controlling a lane change operation from a travel lane on which the vehicle is traveling to an adjacent lane; detecting a driver's lane change intention; and switching between a first control state in which the lane change operation of the vehicle is restricted and a second control state in which the lane change operation of the vehicle is possible, wherein in a case in which the driver's lane change intention is detected when the vehicle is in the first control state, the lane change operation is performed in the controlling after the state of the vehicle has shifted from the first control state to the second control state in the switching.

Yet another embodiment according to the present invention, there is provided a non-transitory computer-readable storage medium storing a program to cause a computer to function as a control unit configured to control a lane change operation from a travel lane on which a vehicle is traveling to an adjacent lane; a detection unit configured to detect a driver's lane change intention; and a switching unit configured to switch between a first control state in which the lane change operation of the vehicle is restricted and a second control state in which the lane change operation of the vehicle is possible, wherein in a case in which the detection unit detects the driver's lane change intention when the state of the vehicle is in the first control state, the lane change operation by the control unit is performed after the switching unit has shifted the state of the vehicle from the first control state to the second control state.

According to the present invention, in a case in which a driving support control level is at a predetermined level, it is possible to shift the driving support control level to an appropriate control level and safely perform a lane change operation when a lane change is to be performed.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
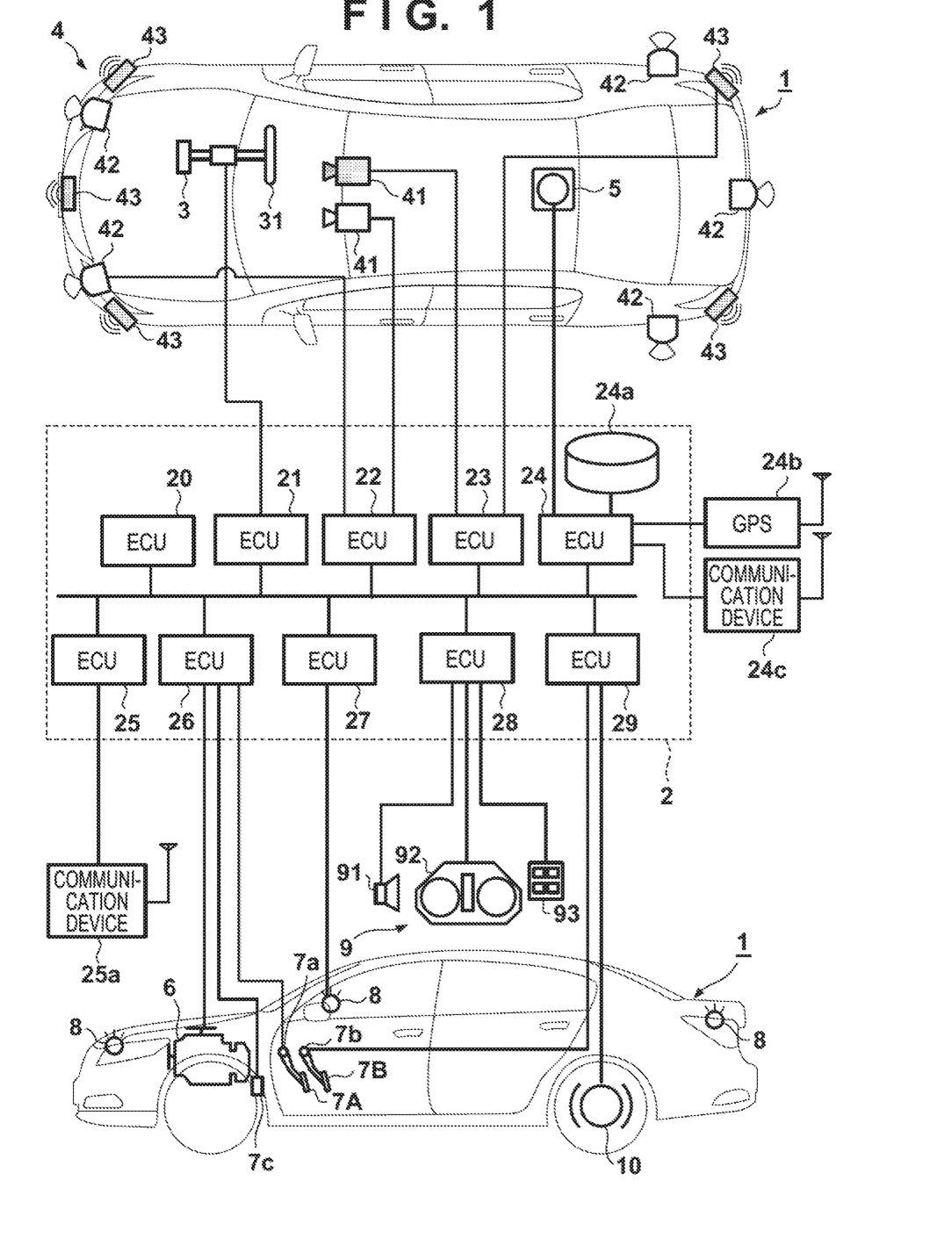
FIG. 1 is a block diagram of a vehicle control apparatus according to an embodiment of the present invention.

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

The control apparatus shown in FIG. 1 includes a control system 2. The control system 2 includes a plurality of ECUs 20 to 29 communicably connected by an in-vehicle network. Each ECU (Electronic Control Unit) functions as a computer which includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

The detection unit 42 is Light Detection and Ranging (LIDAR) (to be sometimes referred to as the LIDAR 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Examples of Control Functions

The control function of the vehicle 1 includes traveling-associated functions associated with control of driving, braking, and steering of the vehicle 1, and notification functions associated with a notification of information to the driver.

Examples of traveling-associated functions are lane maintenance control, lane departure suppression control (road departure suppression control), lane change control, preceding vehicle following control, collision reduction brake control, and erroneous start suppression control. Examples of the notification functions are adjacent vehicle notification control and preceding vehicle start notification control.

Lane maintenance control is one of control processes for the position of the vehicle with respect to a lane. This control makes the vehicle travel automatically (without depending on the driving operation of the driver) on the track of travel set in a lane. Lane departure suppression control is one of control processes for the position of the vehicle with respect to a lane. A white line or a median strip is detected, and steering is automatically performed so the vehicle does not pass across the line. As described above, lane departure suppression control and lane maintenance control are different functions.

Lane change control is control performed to automatically move the vehicle from the lane on which the vehicle is traveling to an adjacent lane. Note that in lane change control, there can be a plurality of patterns of triggers which will initiate the lane change operation. For example, a lane change operation may be started in a case in which lane change possibility determination is performed upon receiving an instruction from the driver and it is determined that a lane change operation is possible. Also, in a case in which the vehicle determines that a lane change operation is possible and notifies the driver of the possibility of the lane change, a lane change operation may be started when the driver makes an instruction upon receiving a notification of this possibility. In addition, there may be a case in which the vehicle will determine whether a lane change operation is possible and automatically perform the lane change operation if the lane change operation is determined to be possible. An example of an arrangement in which the vehicle accepts a lane change instruction from the driver will be described hereinafter.

Preceding vehicle following control is control of automatically following another vehicle traveling ahead of the self-vehicle. Collision reduction brake control is control that supports collision avoidance by automatically braking the vehicle when the possibility of collision against an obstacle ahead of the vehicle rises. Erroneous start suppression control is control to limit acceleration of the vehicle in a vehicle stop state in a case in which the acceleration operation by the driver is a predetermined amount or more, and suppresses an abrupt start.

Adjacent vehicle notification control is control of notifying the driver of the presence of another vehicle traveling on the adjacent lane which is adjacent to the travel lane of the self-vehicle. The driver is notified of, for example, the presence of another vehicle traveling on a side or on a rear side of the self-vehicle. Preceding vehicle start notification control is control performed to notify the driver that another vehicle ahead has started when the self-vehicle and another vehicle ahead are in a stop state. These notifications can be made by the in-vehicle notification devices described above.

Control Levels

The control levels of the driving support control of the vehicle 1 according to this embodiment will be described. The control levels of the driving support control correspond to the control states of the vehicle 1, and a plurality of stages are present as these control levels. Operations that can be autonomously executed by the vehicle 1 and locations where such operations are possible change in accordance with each control level. In addition, the operation and manipulation requested of the driver change in accordance with each level. In this embodiment, the following three levels will be exemplified. Note that although the expression "level" is used here for the sake of descriptive convenience, assume that it does not restrict the hierarchical relationship between the levels and that each level indicates a corresponding control state.

Level A: periphery monitoring duty by the driver "required", steering wheel gripping duty "required", lane maintenance control "enabled", lane change control "enabled", and no operation area restriction Level B: periphery monitoring duty by the driver "required", steering wheel gripping duty "not required", lane maintenance control "enabled", lane change control "enabled", and operable in only predetermined areas Level C: periphery monitoring duty by the driver "not required", steering wheel gripping duty "not required", lane maintenance control "enabled", lane change control "disabled", and operable in only predetermined areas Arrangement According to Lane Change Intention An arrangement for detecting the lane change intention of the driver when the vehicle is set at level C described above will be described.

Figure 2:
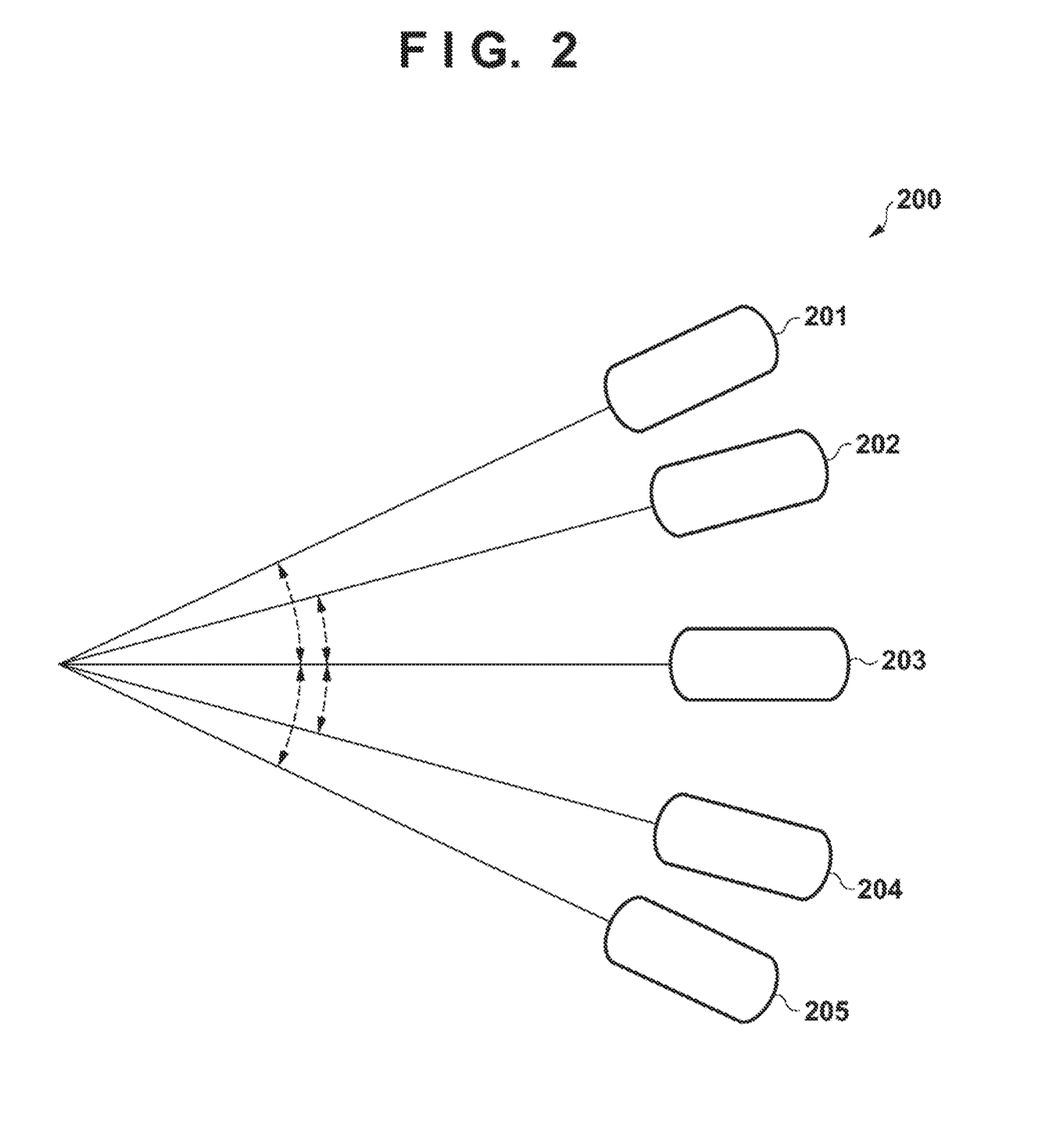
FIG. 2 is a view for explaining an example of the operation of a turn signal lever according to the embodiment of the present invention.

This embodiment will describe an example in which the driver will use a turn signal lever when he/she is to indicate an intention to change lanes. FIG. 2 shows an outline of an operation of a turn signal lever 200 according to this embodiment. An example in which the turn signal lever 200 arranged on right-hand side of the steering wheel will be described here. In this embodiment, the turn signal lever 200 can be shifted to five positions from positions 201 to 205. The position 201 is a position at which the turn signal lever is to be arranged when vehicle 1 is to move left (or make a left turn), and the turn signal lever 200 will be set in a fixed state when it is moved to this position. When the turn signal lever is set to the fixed state, it can be released from the fixed state by rotating the steering wheel clockwise or when the driver operates the turn signal lever 200. In a similar manner, the position 205 is a position at which the turn signal lever is to be arranged when vehicle 1 is to move right (or make a right turn), and the turn signal lever 200 will be set in a fixed state when it is moved to this position. The position 203 indicates a normal position of the turn signal lever 200. Each of the positions 202 and 204 indicates a middle position when the turn signal lever is to shift to the corresponding one of the positions 201 and 205. If the driver lets go of the turn signal lever 200 upon moving the turn signal lever to this middle position, the turn signal lever 200 will automatically return to the position 203. In the following description, each of the positions 201 and 205 will be referred to as a locked position, each of the positions 202 and 204 will be referred to as a half position, and the position 203 will be referred to as the normal position.

As described above, the driver is not requested to perform the periphery monitoring duty and the steering wheel gripping duty at level C. In this embodiment, in a case in which an operation of the turn signal lever 200 corresponding to a direction of lane change by the driver is received in such a state, an operation will be performed by determining that the driver has an intention to change lanes.

Operation Timing

Figure 3:
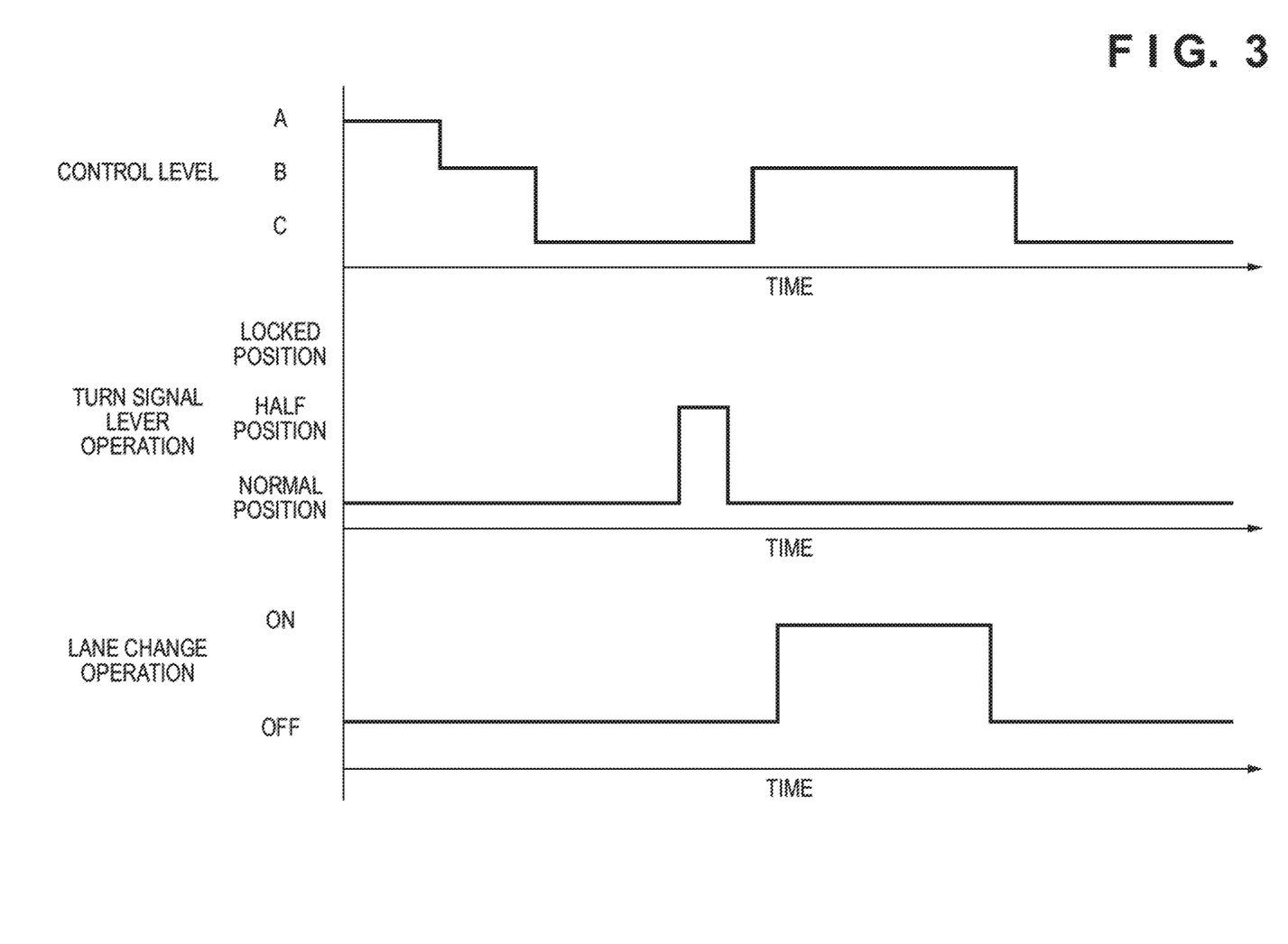
FIG. 3 is a timing chart of a lane change according to the embodiment of the present invention.

FIG. 3 is a timing chart of a lane change operation according to this embodiment. In FIG. 3 shows the timings associated with the control levels of the vehicle 1, the operation positions of the turn signal lever, and the lane change operation. The abscissa indicates the elapsed time, and the ordinate indicates each operation of the operation contents.

In this case, control level A is shown from the point of time when the vehicle 1 is controlled. The control level of the vehicle 1, which is controlled at level A, shifts to level B and level C as the conditions are satisfied. Assume that the driver has operated the turn signal lever when the vehicle 1 is controlled at level C. A description will be given here under the assumption that if the turn signal lever is operated to be set at a half position for 3 sec in the state of level C, the driver intends to change lanes to the lane corresponding to the direction of the half position. After the half position operation has been performed, the turn signal lever automatically moves to the normal position. Note that the operation contents of the turn signal lever to make a lane change instruction are not limited to those described above and may be, for example, an operation using the locked position.

When the vehicle 1 detects the operation described above, the control level shifts to level B. Subsequently, the lane change operation of the vehicle 1 is started. After the lane change operation is completed, the control level is shifted again to level C.

Control Procedure

Figure 4:
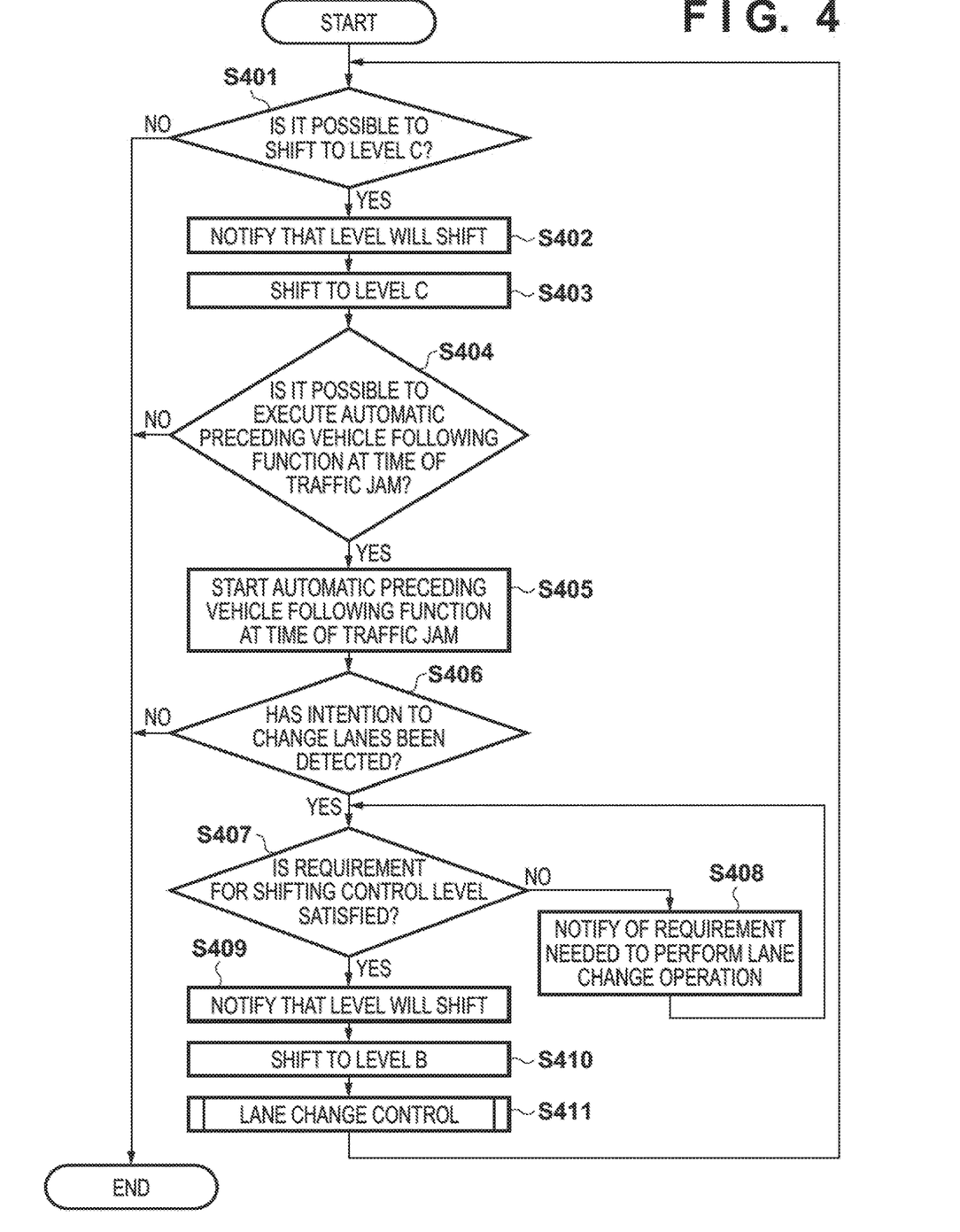
FIG. 4 is a flowchart of control processing according to the embodiment of the present invention.

FIG. 4 is a flowchart showing the control procedure according to this embodiment. This processing procedure is started when the driving support control level shifts to level C described above. Although the various kinds of ECUs and the like included in the vehicle as described above will cooperate to perform processing in each control process, the main body of processing will be indicated as the control system 2 of the vehicle 1 for the sake of descriptive convenience here.

In step S401, the control system 2 determines whether the control level of the vehicle 1 can be shifted to level C. As a condition that allows the control level to be shifted to level C, it will be determined that the control level can be shifted to level C when the vehicle is traveling in a predetermined area. Furthermore, the conditions for implementing the control level shift may change in accordance with other vehicles in the periphery and the travel status. If it is determined that the control level can be shifted (YES in step S401), the process advances to step S402. If it is determined that the control level cannot be shifted (NO in step S401), the current control level is maintained, and the processing procedure ends.

In step S402, the control system 2 notifies the driver that the control level will shift. In the notification method in this case, the driver may be notified of only the fact of a control level shift to level C will occur or may be notified of the duties requested of the driver and the performable operations in level C. In addition, it may be arranged so that the notification method may be by voice or by display on the display unit.

In step S403, the control system 2 shifts the control level of the vehicle 1 to level C.

In step S404, the control system 2 determines whether it is possible to travel by executing an automatic preceding vehicle following function which is to be performed at the time of a traffic jam. This determination can be made in accordance with the distance between the self-vehicle and the preceding vehicle, the travel speed, the peripheral state, and the like, and is not particularly limited. If it is determined that the automatic preceding vehicle following function can be executed (YES in step S404), the process advances to step S405. Otherwise (NO in step S404), the current control level (level C in this case) is maintained, and the processing procedure ends.

In step S405, the control system 2 starts the automatic preceding vehicle following function which is to be performed at the time of a traffic jam.

In step S406, the control system 2 determines whether the driver's intention to change lanes has been detected during the travel by the automatic preceding vehicle following function at the time of a traffic jam. The lane change intention here will be determined by accepting the driver's operation of the turn signal lever 200 as shown in FIG. 2. If the lane change intention has been detected (YES in step S406), the process advances to step S407. Otherwise (NO in step S406), the current control level (level C in this case) is maintained, and the processing procedure ends.

In step S407, the control system 2 determines whether a requirement for shifting the control level is satisfied. This embodiment assumes that lane change will be performed upon shifting the control level from level B to level C when the driver's intention to change lanes has been detected. Hence, in this determination here, it will be determined whether the driver has satisfied the operation duties required in level B. In this example, the execution of periphery monitoring by the driver is set as the requirement for shifting the control level to level B. For example, whether the driver is performing a periphery monitoring operation is determined by using the direction of the line of sight of the driver specified based on an image obtained by an in-vehicle camera or the like provided in the vehicle 1. If it is determined that the requirement for shifting the control level is satisfied (YES in step S407), the process advances to step S409. Otherwise, (NO in step S407), the process advances to step S408.

In step S408, the control system 2 notifies the driver of a requirement needed to perform the lane change operation. More specifically, the control system notifies the driver to cause him/her to satisfy the requirement for shifting the control level to level B as performed in the process of step S407. For example, the control system may notify the driver to prompt him/her to perform periphery monitoring. Subsequently, the process returns to step S407. Note that if the requirement has not been satisfied even when a predetermined time has elapsed after the lane change execution requirement notification has been performed, the control system may determine not to permit the lane change and end the processing procedure. In this a case, the control system may notify the driver of the fact that the requirement has not been satisfied. Also, in this case, the shifting of the control level (that is, the shift to level B) will not be performed.

In step S409, the control system 2 notifies the driver that the control level of the vehicle 1 will shift in accordance with the lane change operation. In the notification method in this case, the driver may be notified of only the fact of a control level shift to level B will occur or may be notified of the duties requested of the driver and the performable operations in level B. In addition, it may be arranged so that the notification method may be by voice or by display on the display unit.

In step S410, the control system 2 will shift the control level of the vehicle 1 to level B.

In step S411, the control system 2 performs lane change control. The details of this control process will be described later with reference to FIG. 5. After the lane change control processing, the process returns to step S401.

Note that the control level shift operation is not limited to the example described above, and for example, a determination as to whether a control level shift to level A is possible may additionally be performed. In addition, it may be arranged so that the shifts between the plurality of levels will be performed stepwise (for example, level C level B level A). Alternatively, it may be arranged so that the level will shift without shifting in a stepwise manner (for example, level C level A).

(Lane Change Control)

Figure 5:
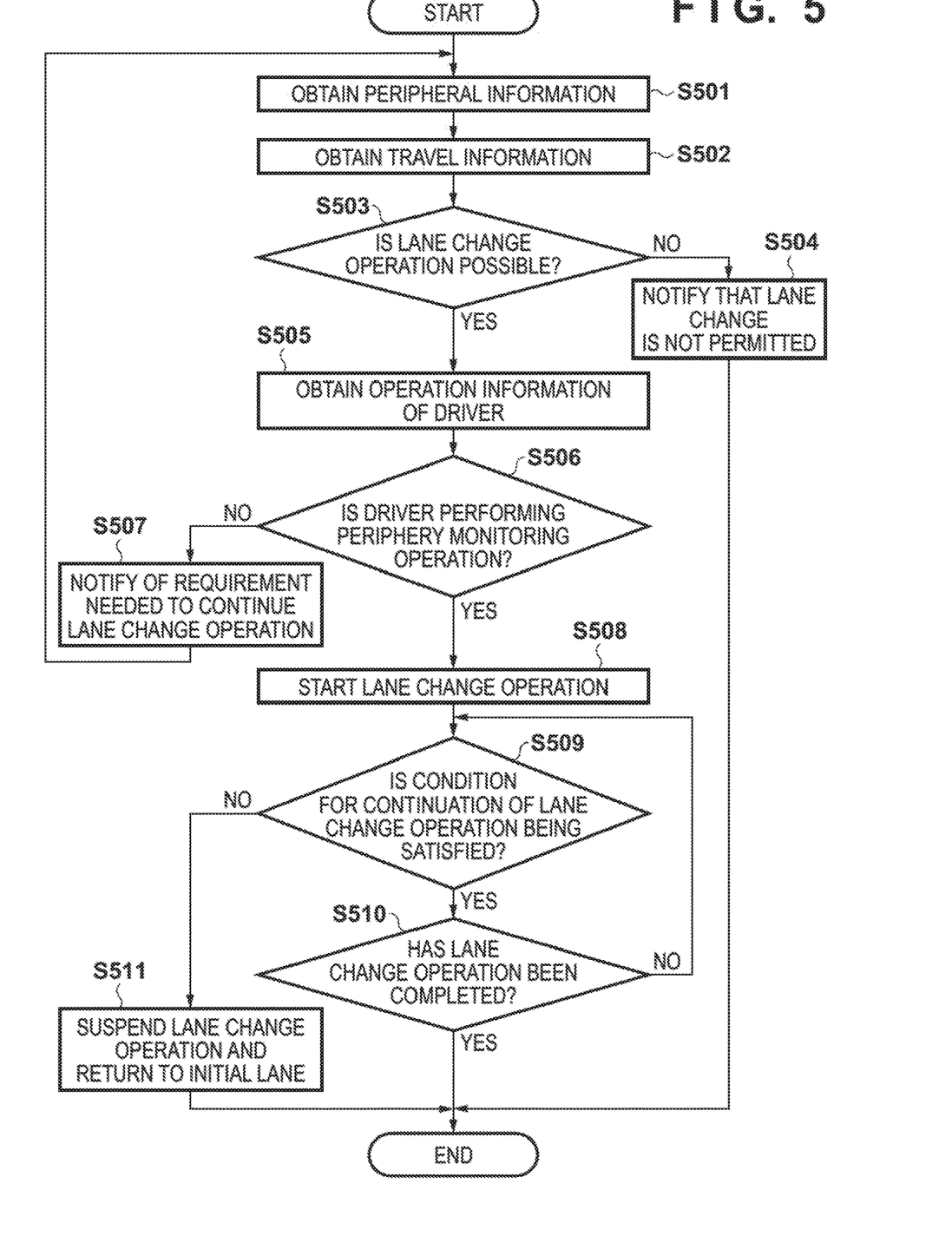
FIG. 5 is a flowchart of lane change processing according to the embodiment of the present invention.

FIG. 5 shows a flowchart of lane change control processing according to this embodiment. This processing corresponds to the process of step S411 of FIG. 4.

In step S501, the control system 2 obtains peripheral information of the self-vehicle. The peripheral information in this case corresponds to, for example, information of the positions of other vehicles in the periphery, the status of the road, and the like. The peripheral information may be obtained from the detection units (sensors, cameras, and the like) included in the vehicle 1 or may be obtained by communicating with an external device.

In step S502, the control system 2 obtains the travel information of the self-vehicle. The travel information in this case corresponds to, for example, the travel speed, the travel position on the road, and the like of the self-vehicle. The travel information may be obtained from the control units of the self-vehicle.

In step S503, the control system 2 determines, based on the obtained peripheral information and travel information, whether lane change to the lane in the direction instructed by the driver is possible. Assume that a conventional method will be used as the determination method here, and a description will not be particularly given in this case. If it is determined that the lane change is possible (YES in step S503), the process advances to step S505. Otherwise (NO in step S503), the process advances to step S504.

In step S504, the control system 2 notifies the driver of a warning indicating that lane change is not permitted. The notification method here may be arranged to perform auditory notification by voice or perform visual display on the display unit. Subsequently, the processing procedure ends, and the process returns to FIG. 4.

In step S505, the control system 2 obtains the operation information of the driver. More specifically, information related to the state of the drive is obtained by the in-vehicle cameras and the like arranged in vehicle 1.

In step S506, the control system 2 determines whether the driver is performing the periphery monitoring operation. More specifically, whether the driver is performing the periphery monitoring operation is determined, after the detection the lane change intention, by using the direction of the line of sight of the driver specified based on the information obtained in step S505. In this case, a determination can be made by determining whether the line of sight of the driver is facing the direction in which the lane change is to be performed. If it is determined that the driver is performing the periphery monitoring operation (YES in step S506), the process advances to step S508. Otherwise (NO in step S506), the process advances to step S507.

In step S507, the control system 2 notifies the driver of the requirement needed to perform the lane change operation. The requirement in this case corresponds to the execution of the periphery monitoring operation by the driver. The notification method here may be arranged to perform auditory notification by voice or perform visual display on the display unit. Subsequently, the process returns to step S501.

In step S508, the control system 2 starts the lane change operation. Note that when the lane change operation is started, it may be arranged so that the driver will be requested to continue the periphery monitoring operation and be notified of the fact that the lane change is in progress.

In step S509, the control system 2 determines whether a condition for the continuation of the lane change operation is being satisfied after the start of the lane change operation. Here, cases in which the lane change operation cannot be continued can be exemplified as follows.

- A case in which the driver has suspended the periphery monitoring operation (a case in which the driver is looking at a direction other than the direction of the lane change)
- A case in which the lane change operation cannot be continued due to a change in the peripheral environment (for example, due to another vehicle or the occurrence of an obstacle)
- A case in which the state of the road cannot be normally recognized
- A case in which a part included in the self-vehicle stops operating normally
- A case in which an instruction to cancel the lane change operation is received from the driver In addition, it may be arranged so that, once the lane change operation has been started, the lane change operation will be continued depending on the travel state of the self-vehicle, even if the state changes to one of the states as described above. Cases in which the lane change operation will be continued can be exemplified as follows.

- A case in which the position of the self-vehicle is already across the white line between the lanes while the lane change operation is being executed A case in which the positional relationship between the self-vehicle and the white line between the lanes before and after the lane change operation satisfies a predetermined condition while the lane change operation is being executed A case in which the distance between the preceding vehicle and the succeeding vehicle in the original lane is closer than a predetermined value Note that the condition for continuation is not limited to that described above, and another condition may be used. In addition, a plurality of conditions may be combined. If it is determined that the condition for continuation is satisfied (YES in step S509), the process advances to step S510. Otherwise (NO in step S509), the process advances to step S511.

In step S510, the control system 2 determines whether the lane change operation has been completed. If it is determined that the lane change operation has been completed (YES in step S510), the processing procedure ends, and the process returns to FIG. 4. Otherwise (NO in step S510), the process returns to step S509.

In step S511, the control system 2 suspends the lane change operation and returns to the lane on which the self-vehicle had been initially traveling. At this time, the control system may notify the driver of the suspension of the lane change operation. The notification method here may be arranged to perform the notification by voice or by displaying the notification on the display unit. Subsequently, the processing procedure ends, and the process returns to FIG. 4.

Note that in the procedure described above, if the control level can be shifted to level C after the lane change has been completed or suspended, the control level is shifted to level C. Otherwise, the control level is maintained at the current level (level B in the example described above). However, this procedure is not limited to that described above, and for example, it may be controlled so that a case in which the lane change operation has been completed and a case in which the lane change operation has been suspended will subsequently have different control levels from each other. Also, the control level to be shifted may be switched in accordance with the state before the control level shift operation is to be performed. Furthermore, the control level to be shifted may be determined in accordance with the peripheral environment, the state of the driver, and the like.

As described above, according to this embodiment, in a case in which the driving support control level is set to a predetermined level, it is possible to shift the control level to an appropriate control level and safely perform a lane change operation when the lane change operation it to be performed.

Modification

The above embodiment described a mode in which a lane change intention that occurs at the time of a predetermined control level is accepted via an operation of the turn signal lever 200. As a modification, another method may be used as the method of detecting the driver's intention to change lanes.

For example, as a method of detecting the driver's intention to change lanes, the driver's periphery monitoring state may be used. More specifically, operation information of the driver at the time of a predetermined control level is used. For example, the state of the driver can be monitored by an in-vehicle camera mounted in the vehicle 1, and it will be detected that the driver has indicated a lane change intention in a case in which the driver is performing a periphery monitoring operation in the direction of the car lane when it has become a state in which a lane change is possible.

The direction of the face, the direction of line of sight, the length of time in which the line of sight stays in the lane change direction, and the like are examples of operation information in this case. Furthermore, other than these pieces of information related to the periphery monitoring operation, a method that combines the gestures of the driver may also be used.

In addition, as another method, the lane change intention may be detected via a pressing operation performed on a button-shaped interface or a rotating operation performed on a knob-shaped interface, instead of an operation of the turn signal lever.

Summary of Embodiment

1. A control system of a vehicle according to the above-described embodiment is a control system (for example, 2) of a vehicle (for example, 1), comprising:

control means (for example, 20-29) for controlling a lane change operation from a travel lane on which the vehicle is traveling to an adjacent lane;

detection means (for example, 200) for detecting a driver's lane change intention; and switching means (for example, 20-29) for switching between a first control state in which the lane change operation of the vehicle is restricted and a second control state in which the lane change operation of the vehicle is possible, wherein in a case in which the detection means detects the driver's lane change intention when the state of the vehicle is in the first control state, the lane change operation by the control means is performed after the switching means has shifted the state of the vehicle from the first control state to the second control state.

According to this embodiment, in a case in which the driving support control level is set to a predetermined level, it is possible to shift the control level to an appropriate control level and safely perform the lane change operation when the lane change operation is to be performed.

2. In the above-described embodiment, a periphery monitoring operation by the driver is not required in the first control state, and the periphery monitoring operation by the driver is required in the second control state.

According to this embodiment, a periphery monitoring operation request can be made to the driver in accordance with the control level.

3. In the above-described embodiment, the lane change intention is indicated by a manipulation or an operation by the driver.

According to this embodiment, the driver's lane change intention can be detected from a manipulation or an operation by the driver.

4. In the above-described embodiment, the control system further comprises notification means (for example, 20-29) for emitting a warning to the driver in a case in which the driver is not performing a periphery monitoring operation after the lane change intention has been detected.

According to the embodiment, after the driver's lane change intention has been detected, the driver can be reliably notified of a requirement needed to perform the lane change operation.

5. In the above-described embodiment, after the lane change by the control means has been completed, the switching means returns the state of the vehicle to a control state before the shift.

According to the embodiment, the vehicle can travel in the same state before and after the lane change operation.

6. In the above-described embodiment, after the lane change by the control means has been completed, the switching means determines a control state to be shifted in accordance with the peripheral environment of the lane on which the vehicle is traveling.

According to this embodiment, after the lane change operation, the vehicle can travel appropriately in accordance with the status at that point.

7. In the above-described embodiment, when the state of the vehicle is to be shifted from the first control state to the second control state, the switching means requests the driver to perform more operations than the operations requested to the driver in the first control state.

According to the embodiment, when the control level is to be shifted, it is possible to request the driver to perform operations corresponding to the control level after the shift.

8. In the above-described embodiment, in a case in which a periphery monitoring operation by the driver cannot be detected after the detection means has detected the driver's lane change intention, the control means does not execute the lane change operation.

According to this embodiment, control can be performed to more safely execute/cancel the lane change operation when the lane change operation is to be performed.

9. In the above-described embodiment, the control means cancels, after the detection means has detected the driver's lane change intention, the lane change operation in accordance with a travel status or the lane on which the vehicle travels.

According to the embodiment, control can be performed to more safely execute/cancel the lane change operation when the lane change operation is to be performed.

10. In the above-described embodiment, the control means cancels the lane change operation in accordance with a travel speed of the vehicle.

According to the embodiment, control can be performed to more safely execute/cancel the lane change operation when the lane change operation is to be performed.

11. In the above-described embodiment, in a case in which a periphery monitoring operation by the driver cannot be detected during the execution of the lane change operation, the control means cancels the lane change operation in accordance with a position of the vehicle and a position of a white line between the lanes before and after the lane change operation.

According to the embodiment, control can be performed to more safely execute/cancel the lane change operation when the lane change operation is to be performed.

12. In the above-described embodiment, in a case in which the vehicle has crossed a white line of the adjacent lane when a periphery monitoring operation by the driver cannot be detected during the execution of the lane change operation, the control means will continue the lane change operation.

According to the embodiment, control can be performed to more safely execute/cancel the lane change operation when the lane change operation is to be performed.

13. In the above-described embodiment, in a case in which the detection means has accepted an instruction to cancel the lane change operation from the driver during the execution of the lane change operation, the control means cancels the lane change operation.

According to the embodiment, control can be performed to execute/cancel the lane change operation in accordance with the intention of a user after the lane change operation has been started.

14. A control method of a vehicle according to the above-described embodiment is a control method of a vehicle (for example, 1), the method comprising:

a control step of controlling a lane change operation from a travel lane on which the vehicle is traveling to an adjacent lane;

a detection step of detecting a driver's lane change intention; and a switching step of switching between a first control state in which the lane change operation of the vehicle is restricted and a second control state in which the lane change operation of the vehicle is possible, wherein in a case in which the driver's lane change intention is detected when the state of the vehicle is in the first control state, the lane change operation is performed in the control step after the state of the vehicle has shifted from the first control state to the second control state in the switching step.

According to this embodiment, in a case in which the driving support control level is set to a predetermined level, it is possible to shift the control level to an appropriate control level and safely perform the lane change operation when the lane change operation is to be performed.

15. A program according to the embodiment described above causes a computer (for example, 2) to function as control means (for example, 20-29) for controlling a lane change operation from a travel lane on which a vehicle (for example, 1) is traveling to an adjacent lane;

detection means (for example, 20-29) for detecting a driver's lane change intention; and switching means (for example, 20-29) for switching between a first control state in which the lane change operation of the vehicle is restricted and a second control state in which the lane change operation of the vehicle is possible, wherein in a case in which the detection means detects the driver's lane change intention when the state of the vehicle is in the first control state, the lane change operation by the control means is performed after the switching means has shifted the state of the vehicle from the first control state to the second control state.

According to this embodiment, in a case in which the driving support control level is set to a predetermined level, it is possible to shift the control level to an appropriate control level and safely perform the lane change operation when the lane change operation is to be performed.

The invention is not limited to the foregoing embodiments, and various variations/changes are possible within the spirit of the invention.

What is claimed is:

1. A control system of a vehicle, comprising:
   a detector configured to detect a lane change intention of a driver; and
   at least one processor with a memory comprising instructions, that when executed by the at least one processor, cause the at least one processor to at least:
   perform lane change control of automatically moving the vehicle from a traveling lane on which the vehicle is traveling to an adjacent lane;
   switch a control state of the vehicle, between a first control state in which the lane change control is restricted and a second control state in which the lane change control is permitted; and determine whether the driver is performing a periphery monitoring operation as an operation duty required to a driver in the second control state, wherein the at least one processor is configured to:

in a case in which the detector detects the lane change intention in the first control state, switch the control state of the vehicle from the first control state to the second control state in accordance with determination that the driver is performing the periphery monitoring operation, and then start the lane change control; and in a case of determining that the driver interrupts the periphery monitoring operation during execution of the lane change control, interrupt the lane change control and return the vehicle to the traveling lane if a relative position of the vehicle with respect to a white line between the traveling lane and the adjacent lane does not satisfy a predetermined condition, and continue the lane change control if the relative position satisfies the predetermined condition.

2. The control system according to claim 1, wherein a periphery monitoring operation by the driver is not required in the first control state, and the periphery monitoring operation by the driver is required in the second control state.

3. The control system according to claim 1, wherein the lane change intention is indicated by a manipulation or an operation by the driver.

4. The control system according to claim 1, wherein the at least one processor is configured to emit a warning to the driver in a case of determining that the driver is not performing the periphery monitoring operation after the lane change intention has been detected by the detector.

5. The control system according to claim 1, wherein after the lane change control has been completed, the at least one processor is configured to switch the control state of the vehicle from the second control state to the second control state.

6. The control system according to claim 1, wherein the at least one processor is configured to determine the control state to be switched after the lane change control has been completed, in accordance with peripheral environment of the traveling lane on which the vehicle is traveling.

7. The control system according to claim 1, wherein when the control state of the vehicle is switched from the first control state to the second control state, the at least one processor is configured to request the driver to perform more operations than the operations requested to the driver in the first control state.

8. The control system according to claim 1, wherein in a case of determining that the driver is not performing the periphery monitoring operation even if the lane change intention of the driver is detected by the detector, the at least one processor is configured not to start the lane change control.

9. The control system according to claim 1, wherein after the lane change intention is detected by the detector, the at least one processor is configured to cancel the lane change control in accordance with a travel status or the traveling lane on which the vehicle is traveling.

10. The control system according to claim 1, wherein the at least one processor is configured to cancel the lane change control in accordance with a travel speed of the vehicle.

11. The control system according to claim 1, wherein the predetermined condition includes a condition that the vehicle is across the white line, and wherein in a case of determining that the driver interrupts the periphery monitoring operation during the execution of the lane change control, the at least one processor is configured to interrupt the lane change control and return the vehicle to the traveling lane if the vehicle is not across the white line, and continue the lane change control if the vehicle is across the white line.

12. The control system according to claim 1, wherein in a case in which the detector has accepted an instruction to cancel the lane change control from the driver during the execution of the lane change control, the at least one processor is configured to cancel the lane change control.

13. A control method of a vehicle, the method comprising:
detecting a lane change intention of a driver;
performing a lane change control of automatically moving the vehicle from a traveling lane on which the vehicle is traveling to an adjacent lane;
switching a control state of the vehicle, between a first control state in which the lane change control is restricted and a second control state in which the lane change control is permitted; and
determining whether the driver is performing a periphery monitoring operation as an operation duty required to a driver in the second control state,
wherein in the performing the lane change control,
in a case in which the lane change intention is detected in the first control state, the control state of the vehicle is switched from the first control state to the second control state in the switching in accordance with determination that the driver is performing the periphery monitoring operation in the determining, and then the lane change control is started, and
in a case of determining that the driver interrupts the periphery monitoring operation during execution of the lane change control, the lane change control is interrupted and the vehicle is returned to the traveling lane if a relative position of the vehicle with respect to a white line between the traveling lane and the adjacent lane does not satisfy a predetermined condition, and the lane change control is continued if the relative position satisfies the predetermined condition.

14. A non-transitory computer-readable storage medium storing a program to cause a computer to:
detect a lane change intention of a driver;
perform a lane change control of automatically moving the vehicle from a traveling lane on which the vehicle is traveling to an adjacent lane;
switch a control state of the vehicle, between a first control state in which the lane change control is restricted and a second control state in which the lane change control is permitted; and
determine whether the driver is performing a periphery monitoring operation as an operation duty required to a driver in the second control state,
wherein in performing the lane change control,
in a case in which the lane change intention is detected in the first control state, the control state of the vehicle is switched from the first control state to the second control state in accordance with determination that the driver is performing the periphery monitoring operation, and then the lane change control is started, and
in a case of determining that the driver interrupts the periphery monitoring operation during execution of the lane change control, the lane change control is interrupted and the vehicle is returned to the traveling lane if a relative position of the vehicle with respect to a white line between the traveling lane and the adjacent lane does not satisfy a predetermined condition, and the lane change control is continued if the relative position satisfies the predetermined condition.

15. The control system according to claim 1, further comprising an in-vehicle camera,
    wherein the at least one processor is configured to determine where the driver is performing the periphery monitoring operation, based on an image obtained by the in-vehicle camera.

16. The control system according to claim 4, wherein in a case of determining that the driver is not performing the periphery monitoring operation even when a predetermined time has elapsed from emitting the warning, the at least one processor is configured not to perform the lane change control.

* * * * *